US007289020B2

(12) United States Patent
Larson et al.

(10) Patent No.: US 7,289,020 B2
(45) Date of Patent: Oct. 30, 2007

(54) METHOD AND APPARATUS FOR ASSISTED VEHICLE IDENTIFICATION AND SERVICE

(75) Inventors: Timothy A. Larson, Ferguson, MO (US); Daniel R. Dorrance, Ballwin, MO (US); William D. Heine, Florissant, MO (US)

(73) Assignee: Hunter Engineering Company, Bridgeton, MO (US)

( * ) Notice: Subject to any disclaimer, the term of this patent is extended or adjusted under 35 U.S.C. 154(b) by 764 days.

(21) Appl. No.: 10/862,597

(22) Filed: Jun. 7, 2004

(65) Prior Publication Data

US 2005/0272478 A1 Dec. 8, 2005

(51) Int. Cl.
*B60Q 1/00* (2006.01)

(52) U.S. Cl. ...................... 340/438; 340/439; 340/441; 340/442; 340/445; 455/566; 455/569.2; 701/22; 701/23; 701/29; 701/33; 701/35

(58) Field of Classification Search ................ 340/438, 340/439, 441, 442, 445; 455/566, 569.2; 701/22, 23, 29, 33, 35
See application file for complete search history.

(56) References Cited

U.S. PATENT DOCUMENTS 6,285,932 B1 9/2001 de Bellefeuille et al.
6,405,111 B2 6/2002 Rogers et al.
6,556,904 B1 4/2003 Larson et al.
6,560,516 B1 5/2003 Baird et al.
6,564,128 B2 5/2003 Baird et al.

FOREIGN PATENT DOCUMENTS

WO 0055786 3/2000

*Primary Examiner*—Tai Nguyen
(74) *Attorney, Agent, or Firm*—Polster, Lieder, Woodruff & Lucchesi, L.C.

(57) ABSTRACT

An intuitive and context sensitive system facilitating the proper identification and service of a vehicle undergoing a vehicle service procedure. The system is configured with a mapping of relevant vehicle identification assistance data or vehicle specific information to one or more selection locations in the user interface of a vehicle service software application. The mapping identifies the availability of additional vehicle identification assistance information, vehicle specific functional applets, and the context within the vehicle service software application at which the additional vehicle identification assistance information or vehicle specific functional applets are relevant. The additional vehicle identification assistance information or applets are maintained external to the vehicle service software application, permitting the additional vehicle identification assistance information and applets to be updated, changed, or replaced without altering the vehicle service software application.

41 Claims, 10 Drawing Sheets

FAHRZEUGNIVEAU

VOLKSWAGEN : PHAETON : V6 MODELL : MIT AUTOMATISCHE DISTANZREGELUNG : 2002-

HOHENSTANDMESSUNG

| | SOLLWERT | +TOL. | -TOL. |
|---|---|---|---|
| VORNE | 407 | 5 | 5 |
| HINTEN | 401 | 5 | 5 |

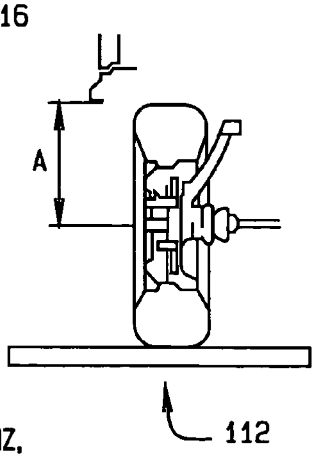

BREMSPEDALFESTSTELLER EINSETZEN.
MOTOR STARTEN.
FAHRSEUG AUF TIEF, HOCH UND ANSCHLIEBEND AUF NORMAINIVEAU FAHREN.
MOTOR ABSTELLAN.
MESSEN SIE DIE NIVEAUHOHE HINTEN UND VORNE ZWISCHEN UNTERSEITE KOTFLUGEL UND MITTE RAD (A).

IST DIE MESSUNG DER NIVEAUHOHE NICHT KORREKT, DANN EINSTELLIMG MIT DEM TESTER VAS 5051 VORNEHMEN.

IST DIE MESSUNG DER NIVEAUHOHE INNERHALB DER TOLERANZ, DANN DAS NIVEAU MIT DEM TEST VAS 5051 DEAKTIVIEREN.

114

ANWEISUNGEN AUSFUHREN, DANACH "WEITER" DRUCKEN

| ABBRECYHEN 105 | RUCKWARTS 105 | VORWARTS 105 | FERTIG 105 |
|---|---|---|---|

FIG. 18

METHOD AND APPARATUS FOR ASSISTED VEHICLE IDENTIFICATION AND SERVICE

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to vehicle service systems, and in particular, to a method and apparatus for providing the operator of a vehicle service system with assistance in identifying a vehicle or vehicle characteristics and the service of the vehicle.

While the present invention will be described below in the context of vehicle wheel alignment systems, those of ordinary skill in the vehicle service field will readily recognize that the problems addressed by the present invention are present with a wide variety of conventional vehicle service devices, such as brake lathes, engine diagnostic systems, and frame alignment systems, and as such, the inventive concepts of the present invention are not limited to use with vehicle wheel alignment systems, but may be applied to any of a wide variety of vehicle service systems.

With vehicle wheel alignment systems, it is critical that the operator accurately identify the type of vehicle to be serviced prior to beginning any wheel alignment adjustment procedures. Proper identification of the vehicle permits the vehicle wheel alignment system to recall the correct vehicle alignment specifications from a database of vehicle alignment specifications, for use during the alignment procedures, as well as any vehicle-specific alignment instructions or required steps.

Due to the wide variety of vehicle types and configurations, even within a single manufacturer's model line, properly identifying a vehicle can be a challenge for even the most experienced vehicle service technicians. Often, due to production line variations by a vehicle manufacturer, details other than just vehicle make, model, and year of manufacture are required to properly identify a vehicle before beginning an alignment service procedure. For example, differences in the vehicle engine type, suspension type, spring type, wheel type, and body style can all be important factors in properly identifying a vehicle, as each variation or combination may require a different set of wheel alignment specifications. Other less-obvious factors can render the proper identification of a vehicle a challenge to even a skilled service technician.

For example, some vehicle manufacturers vary vehicle specifications by their own internal model identification codes (commonly referred to as "chassis codes"), which are not the same as the commonly recognized vehicle model names. In extreme cases, these chassis codes can change within a single model year, as manufacturers produce two or more different generations of vehicle with the same model year, under the same model name, but with different internal model identification codes. An example of this can be found in the BMW vehicle model lines. BMW vehicle models are commonly recognized by consumers using a series designation, i.e. the "3-Series", "5-Series", or "7-Series". Less commonly known are the "M-Series", "6-Series" and "8-Series" BMW vehicle models. However, internally, BMW vehicle models are identified by the manufacturer using chassis codes. For example, the 5-Series BMW vehicle models produced from 1974-1981 are designated as the "E12" models, while the 5-Series BMW vehicle models produced from 1981-1988 are designated as the "E28" models. Clearly, reference to simply the commonly known 5-Series designation provides insufficient information for a service technician to properly identify the vehicle to a vehicle service system.

Traditionally, to provide proper vehicle identification to a vehicle wheel alignment system, the operator or technician identifies the vehicle through a series of hierarchical selections which are presented as lists of text on a user interface by the vehicle wheel alignment system software application. The technician typically selects the vehicle make, and is presented with a new list of vehicle models. The technician then selects the appropriate vehicle model, and is presented with a new list of model years. This process is repeated using additional distinguishing details until the technician has provided sufficient information for the vehicle wheel alignment system to retrieve the required wheel alignment specifications and alignment procedures for the identified vehicle.

In order to properly complete this procedure, the technician must be able to understand all of the selections provided by the user interface, and must be able to properly examine the vehicle to determine any required details, such as engine size, suspension configuration, wheel size, etc. With the traditional systems, when unusual selections are required, the technician is obliged to make a selection to the best of their ability or to attempt to find an answer by utilizing reference materials such as shop manuals or vehicle owner's manuals.

Accordingly, it would be advantageous to provide an intuitive and context sensitive system and procedure for providing information to the technician to assist with the proper identification and service of a vehicle by providing key information and illustrations at appropriate points during the vehicle identification process or service procedures. It would be further advantageous to provide a framework for such a system and procedures which could be implemented external to the vehicle service applications, permitting the assistance information to be added, changed, or modified without altering the functionality of the vehicle service applications on the vehicle service system.

BRIEF SUMMARY OF THE INVENTION

Briefly stated, the present invention provides an intuitive and context sensitive system facilitating the proper identification and service of a vehicle undergoing a vehicle service procedure. The system is configured with a mapping of relevant vehicle identification and service assistance data to one or more selection locations in the user interface of a vehicle service application. The mapping identifies the availability of additional vehicle identification or service information, and the context within the vehicle service application at which the additional vehicle identification or service information is relevant. The information is maintained external to the vehicle service software application, permitting the additional vehicle identification or service information to be updated, changed, or replaced without altering the vehicle service application.

In an alternate embodiment of the present invention, the relevant vehicle identification or service information is maintained in one or more hypertext markup language (HTML) documents. Each HTML document is maintained independently of the vehicle service software application, and may contain text, graphics, tables, multimedia content, or hyperlinks to additional relevant data.

In an alternate embodiment of the present invention, vehicle identification or service data is maintained in one or more hypertext markup language (HTML) documents which include one or more HTML database identifiers or tags. These database identifiers may be associated with a vocabulary database, a vehicle specification database, or a vehicle measurement database. Vocabulary database identifiers are utilized to identify text words or phrases in a language database for display to an operator in a corresponding language, on a vehicle service system user interface. During display of the HTML documents, the HTML tags are identified by the vehicle service system, and the language database of text translations is accessed to retrieve text associated with a predetermined language identifier for the vehicle service system. Vehicle specification database identifiers are utilized to identify vehicle-specific specifications in a vehicle specification database for display or utilization by a vehicle service system. Correspondingly, vehicle measurement database identifiers are utilized to direct the vehicle service system to display to an operator corresponding static or "live" vehicle measurements.

In an alternate embodiment of the present invention, the relevant vehicle identification or service data is maintained in one or more hypertext markup language (HTML) documents. Each HTML document is maintained independently of the vehicle service software application, and may be modified, replaced, or deleted without altering the functionality of the vehicle service software application. The HTML document may contain relevant vehicle identification or service data including vehicle-specific applets providing functional and/or interactive elements to assist in vehicle identification or a vehicle-specific service procedures.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 18 is a vehicle alignment procedure assistance screen of the present invention displayed in a foreign language corresponding to language and phrase tags in an associated data file.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

While the present invention will be described below in the context of vehicle wheel alignment systems, those of ordinary skill in the vehicle service field will readily recognize that the problems addressed by the present invention are present with a wide variety of conventional vehicle service devices, such as wheel balancers, brake lathes, engine diagnostic systems, and frame alignment systems. As such, the inventive concepts of the present invention are not limited to use with vehicle wheel alignment systems, but may be applied to any of a wide variety of vehicle service systems which include at least a processor configured to execute one or more vehicle service software applications, a display operatively coupled to the processor for providing information to an operator, and at least one input device wherein the operator can provide information to, or direct the operation of, the processor.

Figure 1:
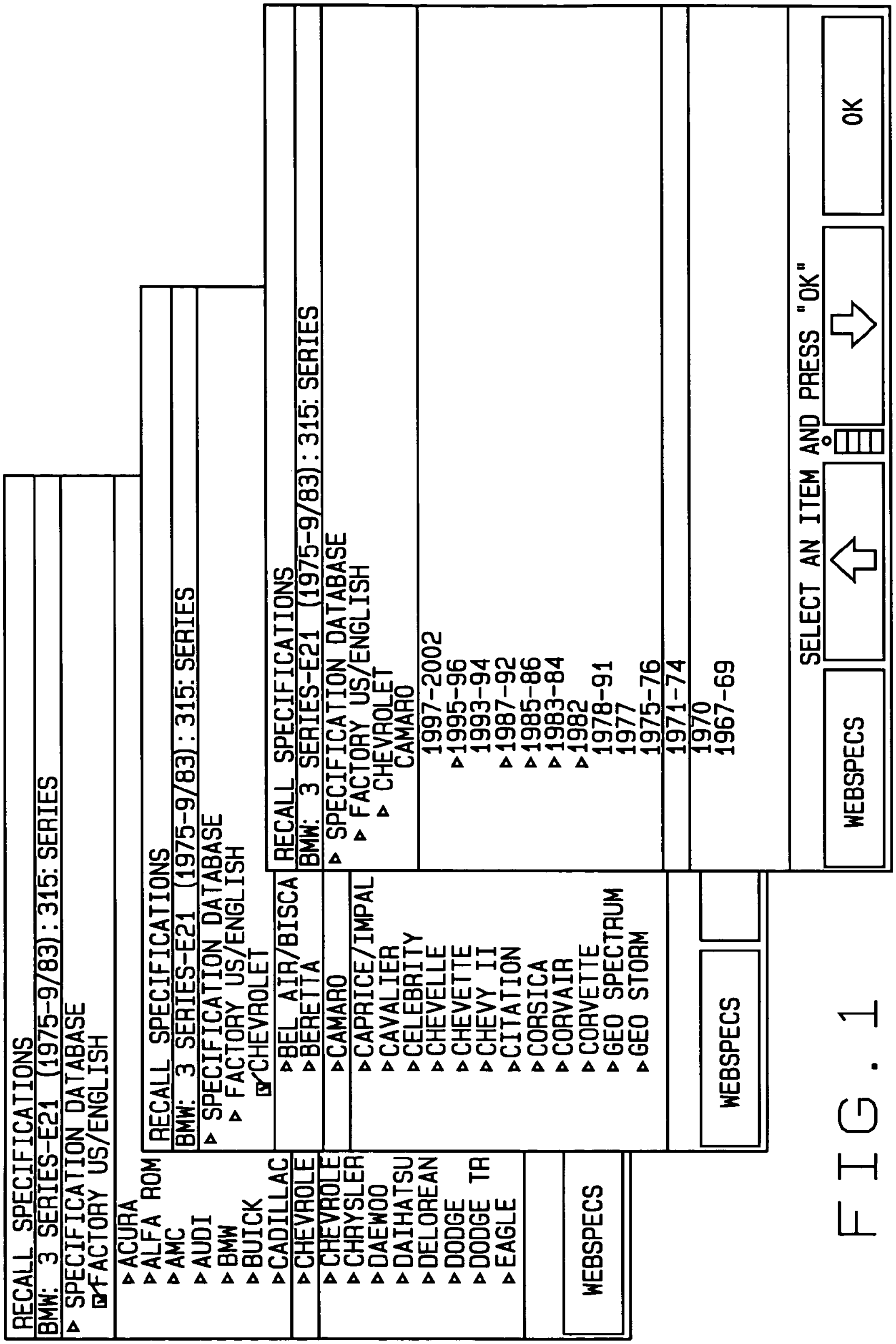
FIG. 1 PRIOR ART
FIG. 1 is an illustration of a set of prior art hierarchical vehicle model selection screens.
Figure 2:
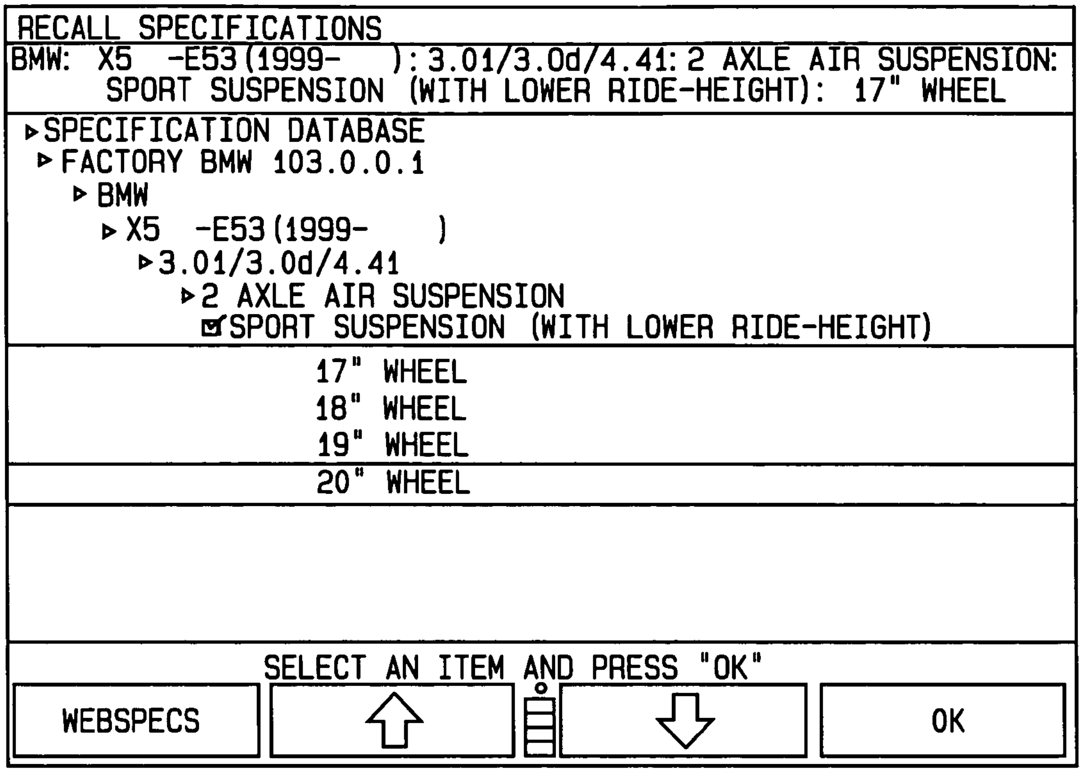
FIG. 2 PRIOR ART
FIG. 2 is an illustration of a vehicle-specific detail prior art vehicle model selection screen.

As seen in FIG. 1, conventional vehicle service systems require an operator to identify a vehicle undergoing a service procedure by utilizing one or more hierarchical listings 10 of vehicle makes, models, and production years. To properly identify a vehicle using these hierarchical listings 10, the operator must have sufficient prior knowledge regarding the vehicle undergoing service to be able to properly select a corresponding entry from each sequential hierarchical listing 10 until enough information has been provided to the vehicle service system to uniquely identify the vehicle undergoing service. For some vehicles, as shown in FIG. 2, the operator is required to select an entry from a hierarchical listing 10 detailing information about the specific configuration of the vehicle undergoing service, such as identifying wheel diameter measurements. This type of information may require an operator to obtain one or more measurements from the vehicle undergoing service.

Figure 3:
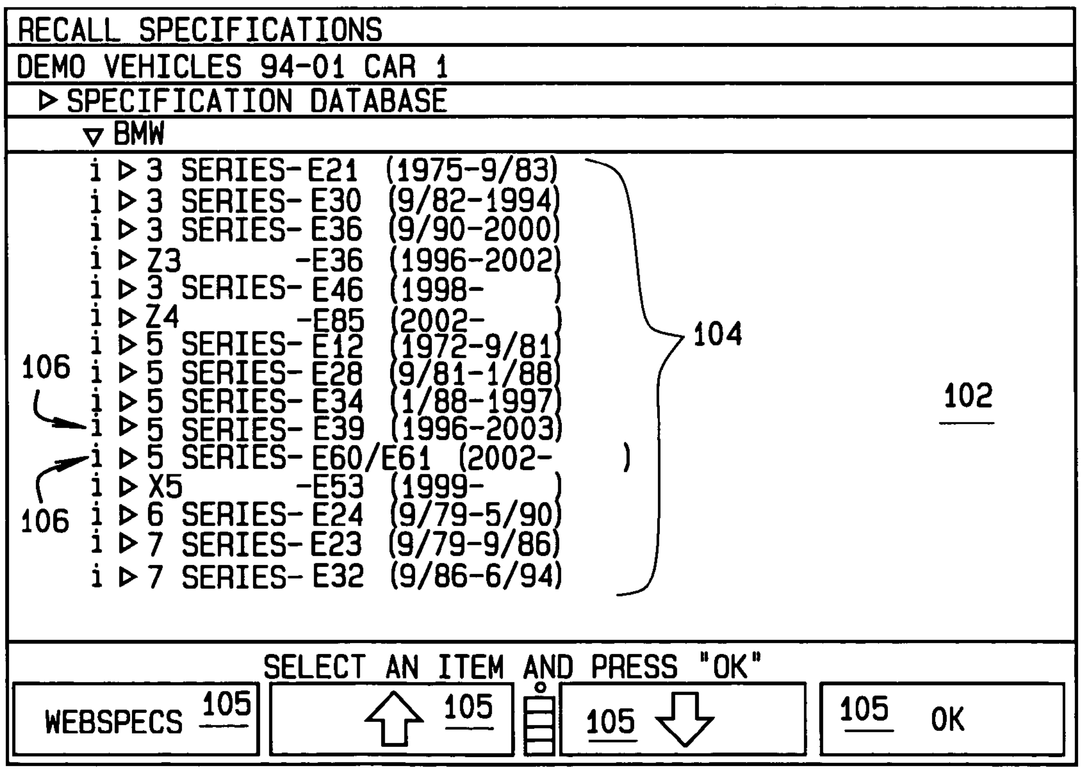
FIG. 3 is an illustration of a vehicle model selection screen of the present invention including a set of interactive vehicle identification assistance components.

In a first embodiment of the present invention, shown in FIG. 3, a vehicle service system 100 is configured with a vehicle service application to provide an interactive interface 102, such as a graphical user interface (GUI) in which information is presented to an operator. The information may be utilized to aid an operator in properly identifying a vehicle undergoing a service procedure, to display measurements from the vehicle, or to provide instructions to the operator for completing one or more vehicle service procedures.

During a vehicle identification process, a display of vehicle identification selections 104 such as vehicle make, model, and production year choices, is presented to the operator in the interface 102 in a logical and structured manner. Functional controls 105 are provided by the interface 102 for navigation through various levels or display screens of the interface 102. To aid an operator in selecting a proper choice, one or more assistance elements 106 are displayed in the interface 102 in a context-sensitive positional or logical relationship to a vehicle identification selections 104 for which operator assistance is available. The assistance elements 106 are considered "context sensitive" in that assistance elements 106 associated with different vehicle identification selections 104, or on different displayed screens of the interface 102, provide an operator with different information or perform different functions corresponding to the displayed context in which the assistance element 106 is activated or selected by the operator. For example, an assistance element 106 displayed adjacent a vehicle model selection on a list of vehicle models provides a link to information assisting an operator in identifying the specific vehicle model selection. Correspondingly, an assistance element 106 displayed adjacent a step in a vehicle service procedure provides a link to information assisting the operator in completing that particular step.

In the preferred embodiment, each "context-sensitive" assistance element 106 is a graphical user interface button emblazoned with the alphanumeric symbol "i" for "information". The assistance element 106 may be selected or activated in response to an operator directed input, such as the placement and "clicking" of a cursor or pointer on the assistance element 106. In alternative embodiments, selection or activation of the assistance element 106 may be through a keyboard command, a touch-screen interface, a voice interface, or any other suitable operator input interface. Correspondingly, those of ordinary skill in the art will recognize that the context-sensitive assistance element 106 is not limited to a graphical user interface button, and may be embodied in any form or means providing an operator with a suitable indication of the availability of, and ability to access, additional information or procedures.

Figure 4:
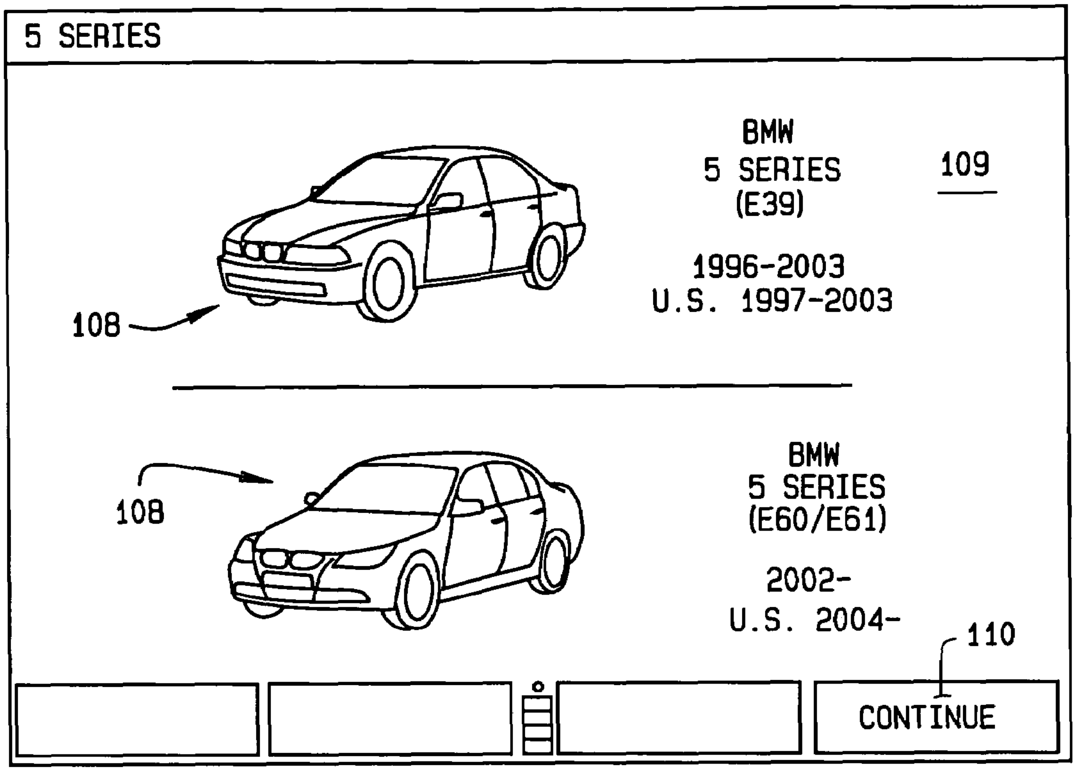
FIG. 4 is an interactive vehicle identification screen of the present invention illustrating different model years and body style types for a vehicle model.

In the context of a vehicle identification process, as illustrated in FIG. 3, the operator is presented with a series of selections 104 related to the identification of a vehicle model by a single vehicle manufacturer (BMW). An assistance element 106 is associated with each vehicle model selection 104. An operator may select or activate any assistance element 106 to obtain additional information about the associated vehicle model, aiding in the identification of the vehicle undergoing a service procedure. For example, as shown in FIG. 4, selection of an assistance element 106 associated with the BMW 5-Series (E39, 1996-2003) or BMW 5-Series (E60/E61, 2002-present) vehicle models will present corresponding illustrations or photographs 108 of the vehicle models on the display of the interface 102. The illustrations or photographs 108 may be of entire vehicles, as shown in FIG. 4, or may illustrate other information which may be utilized to distinguish vehicle models, such as the location of identifying vehicle labels, subtle body style changes, relevant portions of a Vehicle Identification Number (VIN), etc.

Preferably, as shown in FIG. 4, the illustrations or photographs 108 are displayed in a separate window 109 of the interface 102, and a "BACK" or "CONTINUE" navigation button 110 is provided to return the operator to the point in the vehicle identification process from which the assistance element 106 was activated. Those of ordinary skill in the art will recognize that the assistance information, such as illustrations or photographs 108, may be presented to the operator using a variety of different methods, and is not restricted to presentation in a separate GUI window 109. For example, the information may be provided in the same region of the interface 102 in which the assistance element 106 is located.

Figure 5:
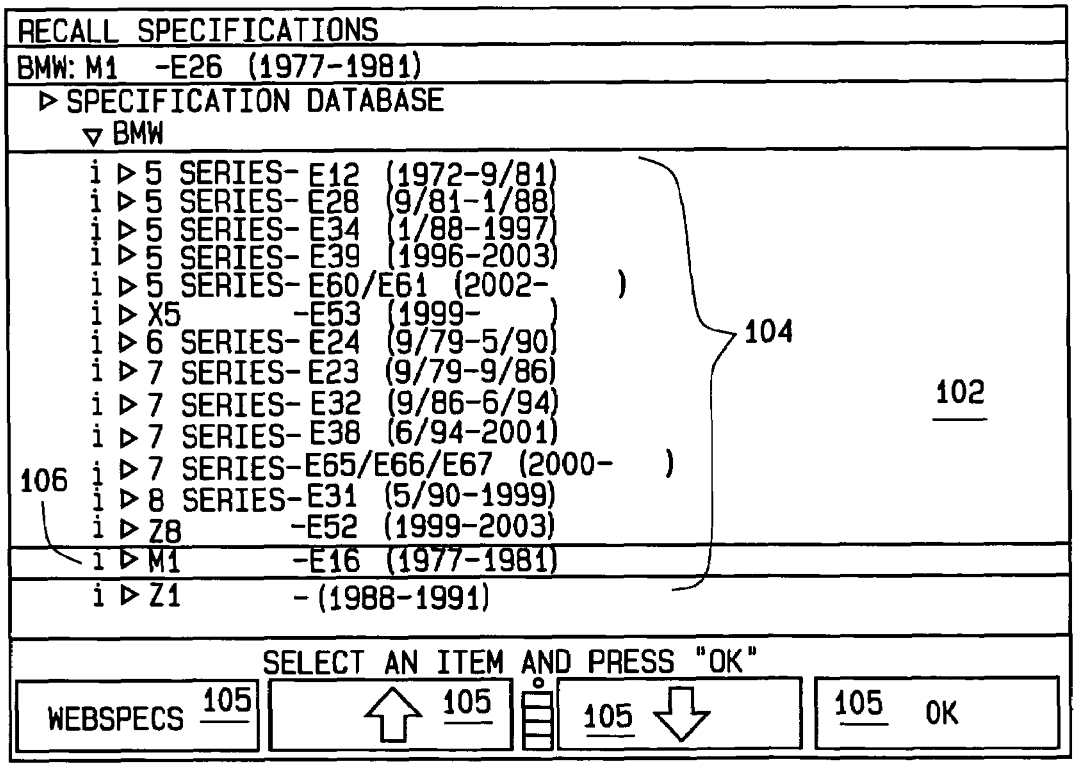
FIG. 5 is a vehicle model selection screen of the present invention as shown in FIG. 3, illustrating the selection of an uncommon vehicle model.
Figure 6:
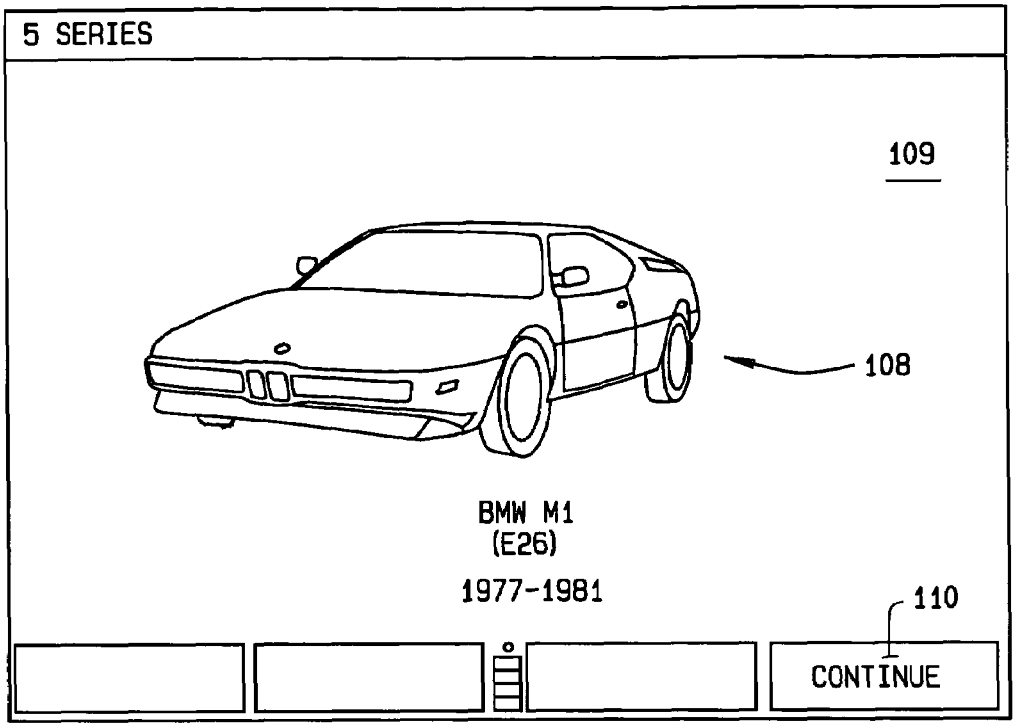
FIG. 6 is an interactive vehicle identification screen of the present invention illustrating a vehicle model as shown selected in FIG. 5.
Figure 7:
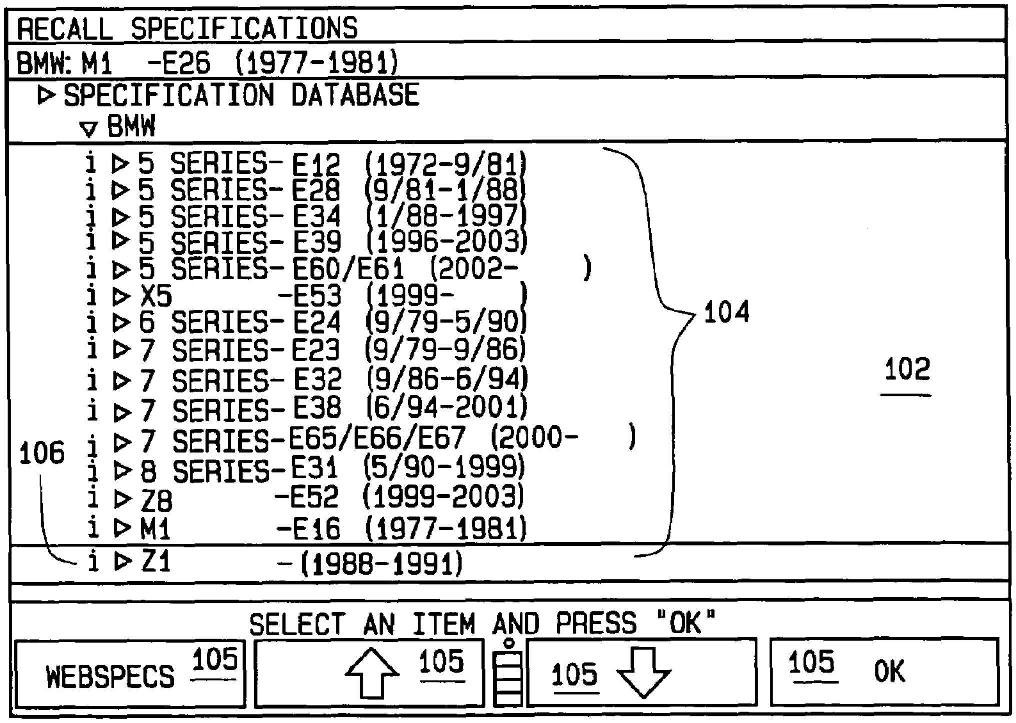
FIG. 7 is a vehicle model selection screen of the present invention as shown in FIG. 5, illustrating the selection of a different vehicle model.
Figure 8:
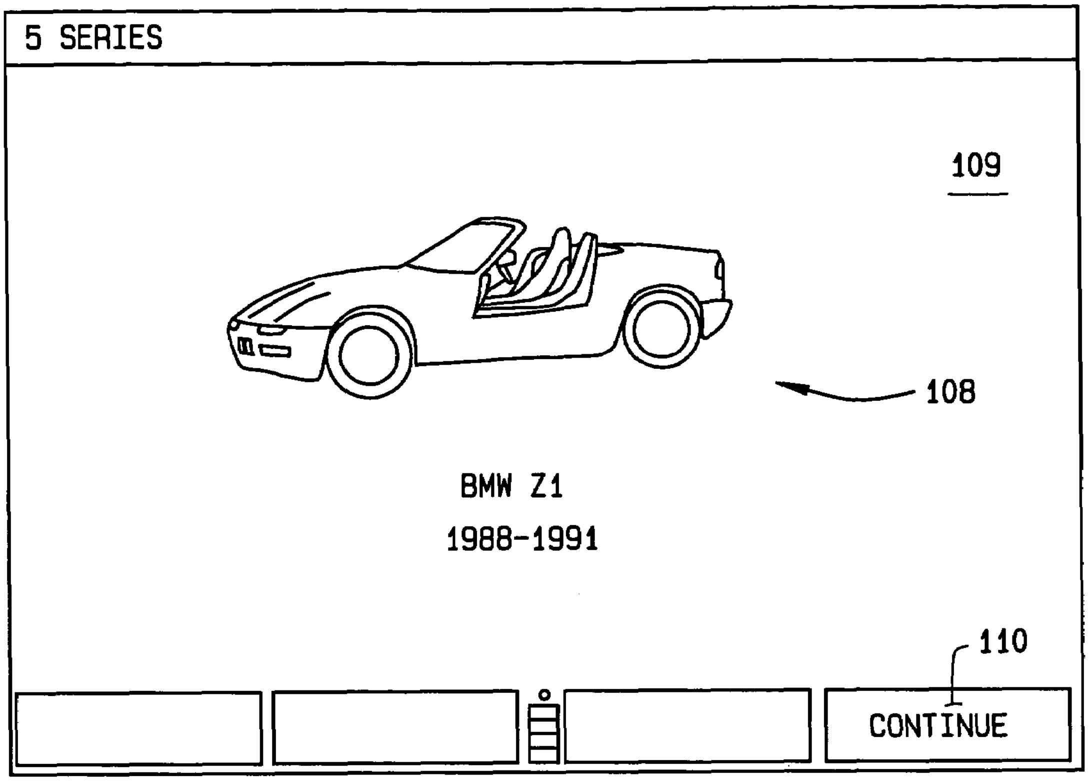
FIG. 8 is an interactive vehicle identification screen of the present invention illustrating a vehicle model as shown selected in FIG. 7.

In addition to providing an operator with illustrations or photographs 108 of variations to a vehicle model during different production years, the assistance element 106 may be utilized by an operator to view an illustration or photograph 108 of an uncommon or unfamiliar vehicle model. For example, as shown in FIGS. 5 and 6, an operator may select an assistance element 106 associated with an uncommon vehicle model (BMW M1), which has only a single body style, and be presented with the corresponding illustration or photograph 108 in the separate window 109. Similarly, section of the assistance element 106 associated with another unfamiliar vehicle model (BMW Z1), as shown in FIG. 7, will result in the presentation of the corresponding illustration or photograph 108 in the separate window 109, as shown in FIG. 8

Figure 9:
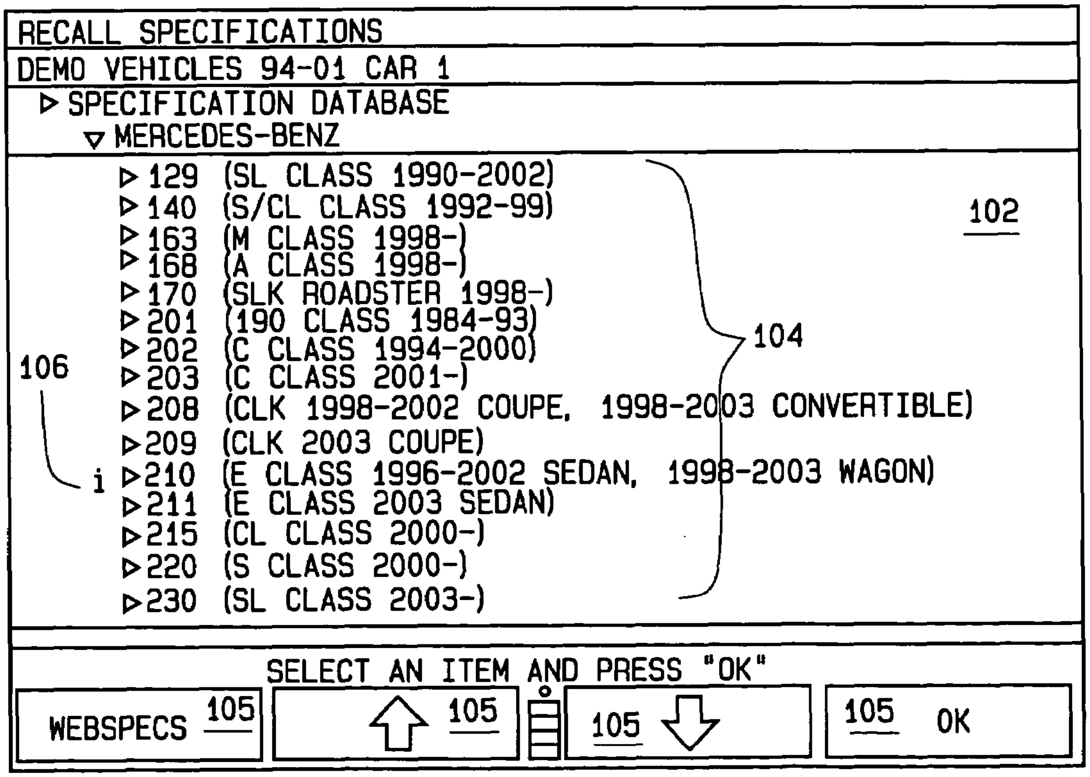
FIG. 9 is an illustration of a vehicle model selection screen of the present invention including a single interactive vehicle identification assistance component associated with a listing of vehicle models.
Figure 10:
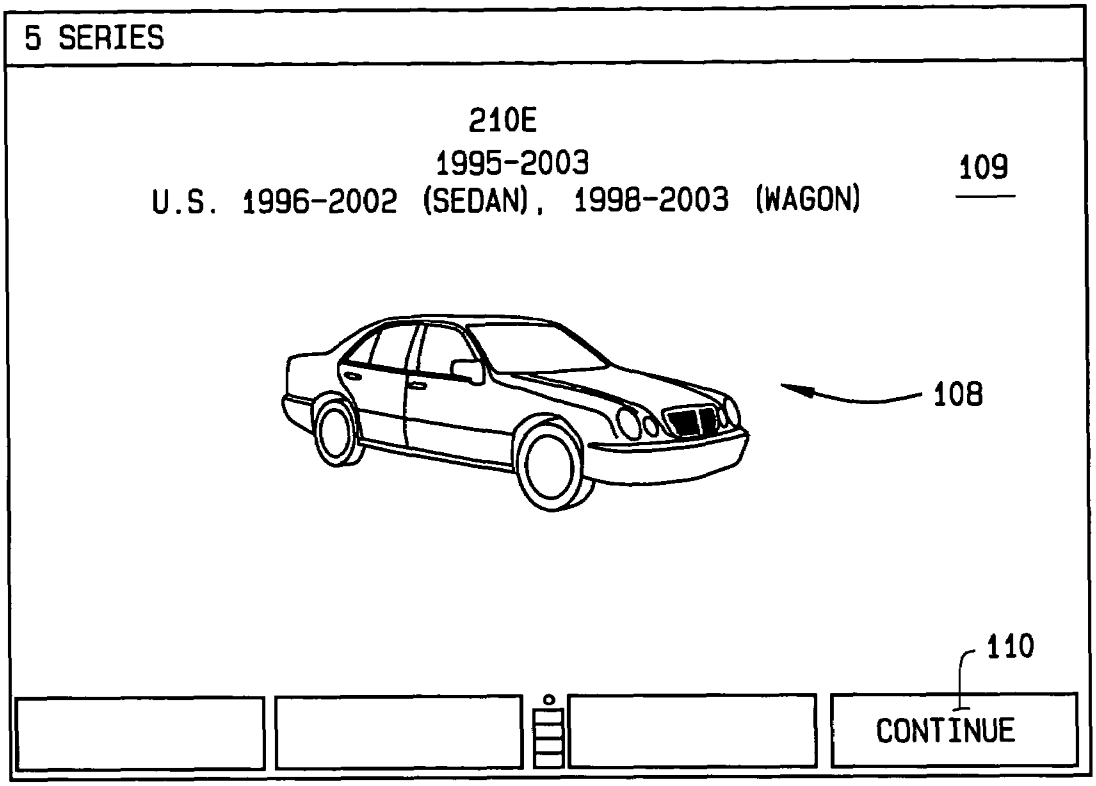
FIG. 10 is an interactive vehicle identification screen of the present invention illustrating the associated vehicle model of FIG. 9.

For some vehicle makes, an assistance element 106 may not be associated with each displayed choice or selection 104 in the interface 102. For example, as shown in FIGS. 9 and 10, only one assistance element 106 is associated with an selection 104 in a listing of Mercedes-Benz vehicle models, providing an operator with an illustration or photograph 108 of the corresponding vehicle model, i.e., an E-Class 1996-2002 Sedan.

Figure 11:
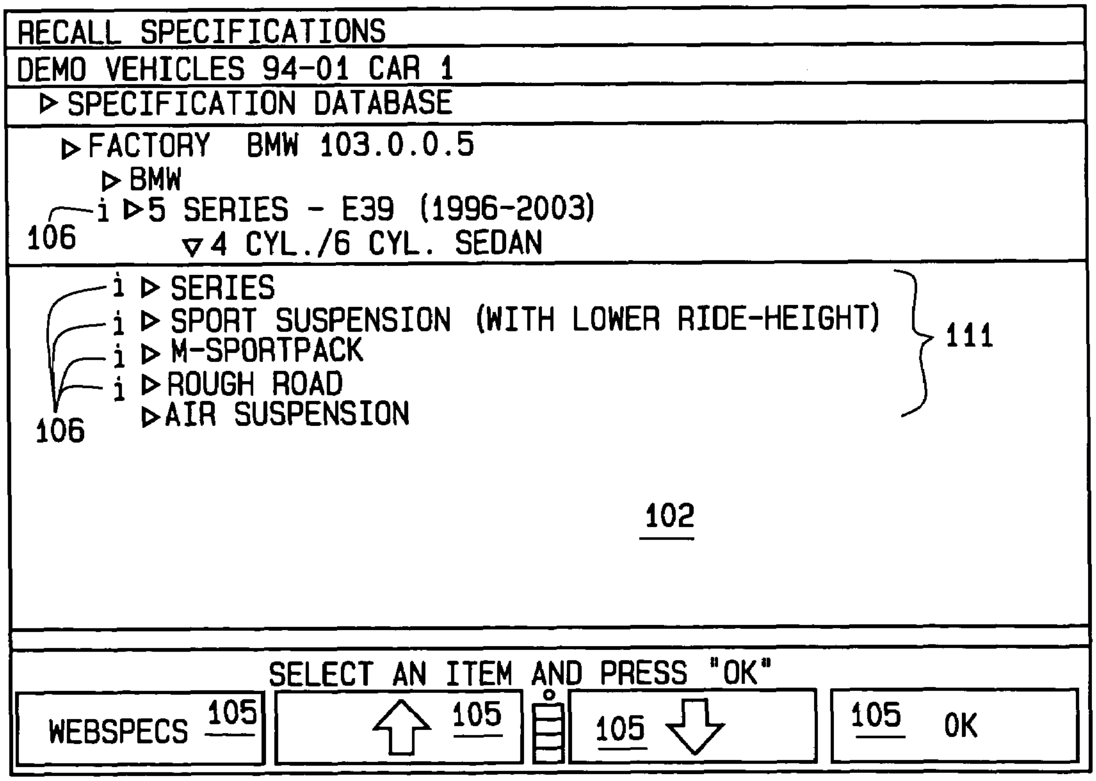
FIG. 11 is an interactive vehicle model-specific identification screen of the present invention including a set of interactive vehicle identification assistance components.
Figure 12:
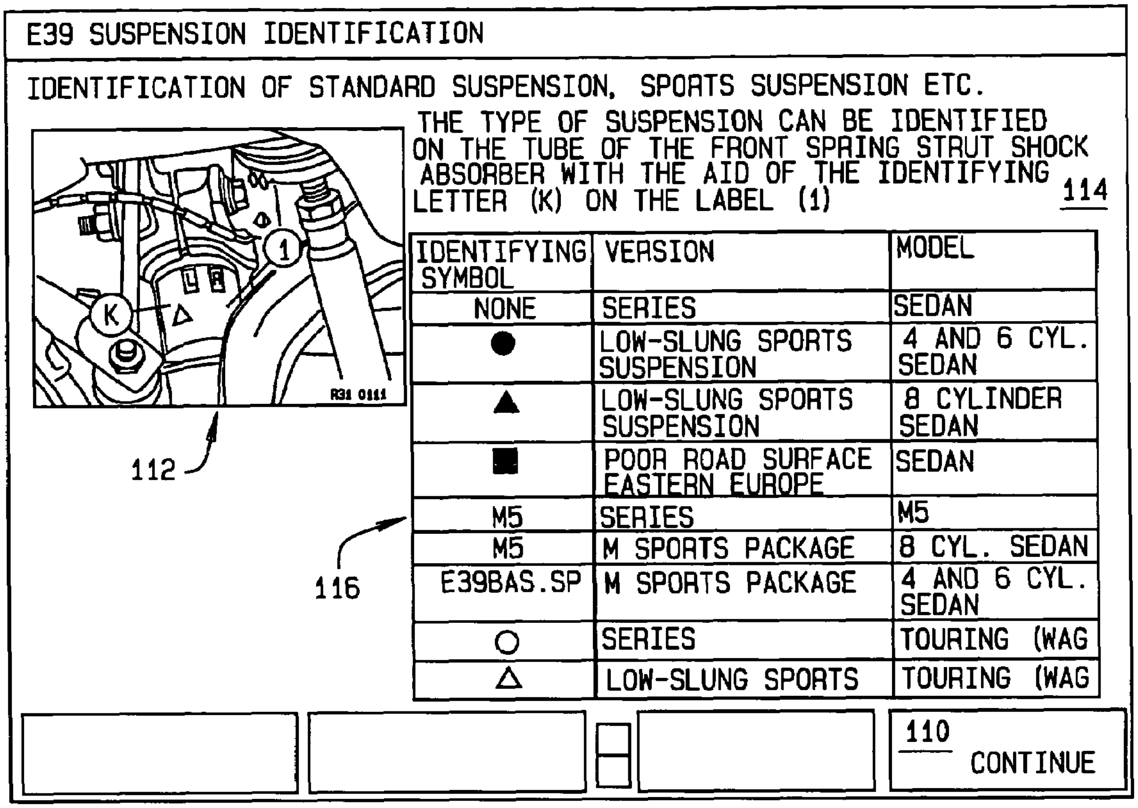
FIG. 12 is an illustration of a vehicle model-specific identification screen of the present invention associated with the vehicle model-specific selections of FIG. 11 including text, illustrations, and tabular vehicle model-specific identification information.
Figure 13:
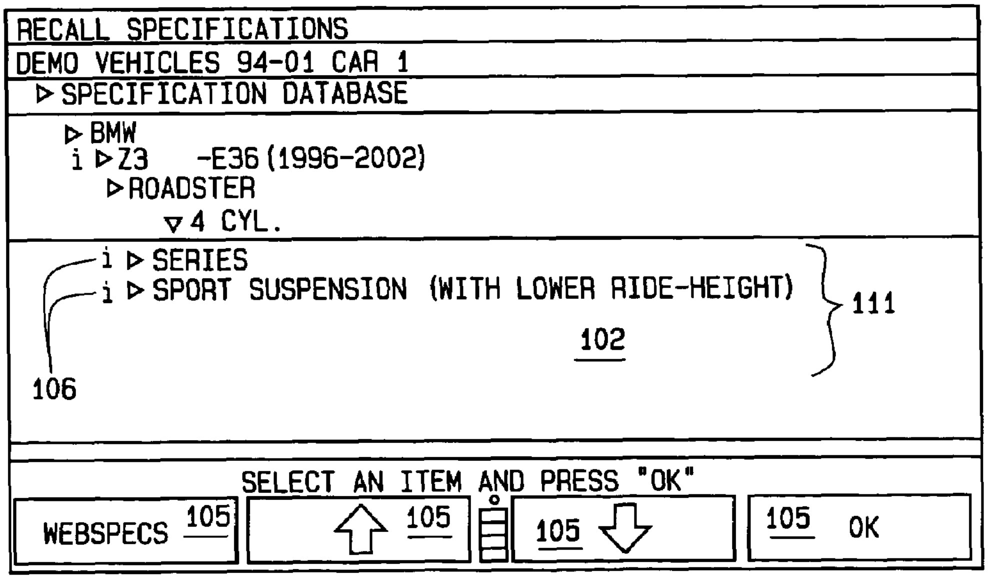
FIG. 13 is an interactive vehicle model-specific identification screen of the present invention including a set of interactive vehicle identification assistance components.
Figure 14:
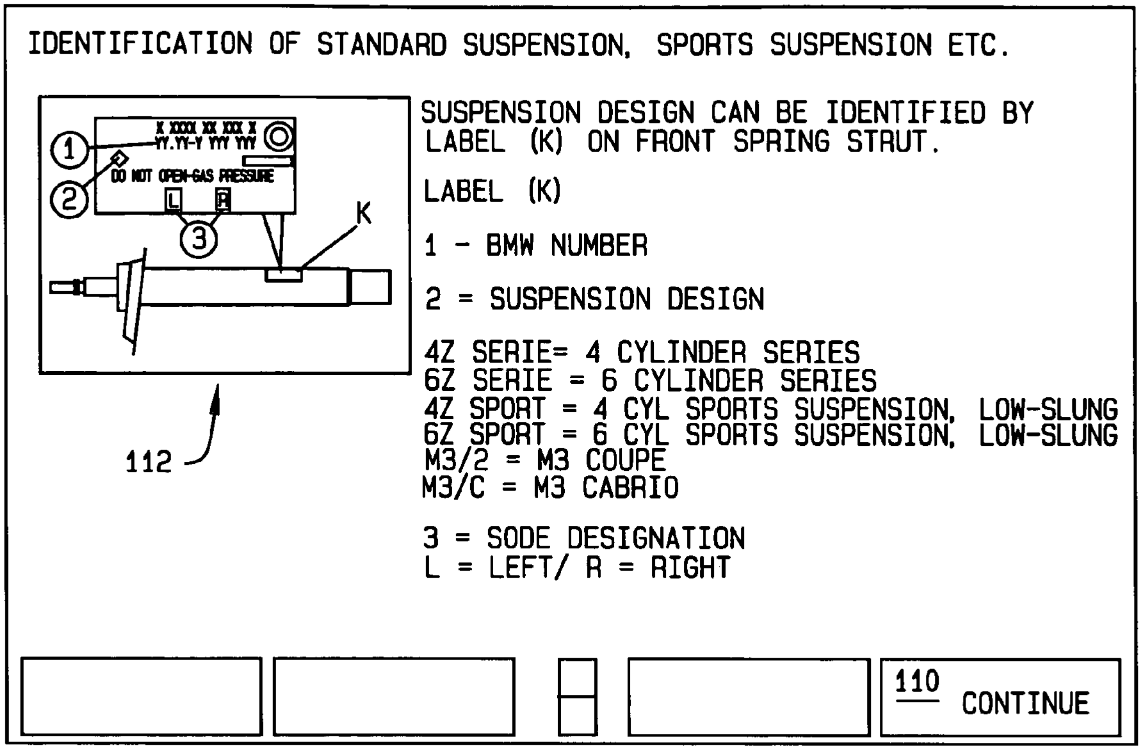
FIG. 14 is an illustration of a vehicle model-specific identification screen of the present invention associated with the vehicle model-specific selections of FIG. 13 including text and illustrations of vehicle model-specific identification information.

Once an operator has identified a vehicle model selection 104 from the information presented in the interface 102, additional vehicle model-specific selections 111 may be presented, requiring the operator to make additional choices. Corresponding assistance elements 106 may be associated with one or more of the vehicle model-specific selections 111. For example, as shown in FIG. 11, after selection of a vehicle make (BMW) and model (5-Series, 4 or 6 cylinder Sedan), the operator is required to identify the specific type of vehicle suspension system with which the vehicle undergoing service is configured. To assist the operator in the proper selection, assistance elements 106 indicate that additional information is available for several of the vehicle model-specific selections 111. FIG. 12 illustrates a exemplary display of additional information available in response to the activation of a vehicle model-specific selection 111 as shown in FIG. 11. As seen in FIG. 12, the additional information may include, but is not limited to, an illustration 112 of a specific vehicle component, such as a vehicle suspension system, instructional text 114 detailing what information the operator should look for, and a table 116 of identification codes and corresponding vehicle suspension configurations. A similar example is shown in FIGS. 13 and 14, illustrating the availability of vehicle model-specific selections 111 for a different vehicle model (Z3) of the same vehicle make (BMW), and corresponding illustrations 112 with instructional text 114.

Figure 15:
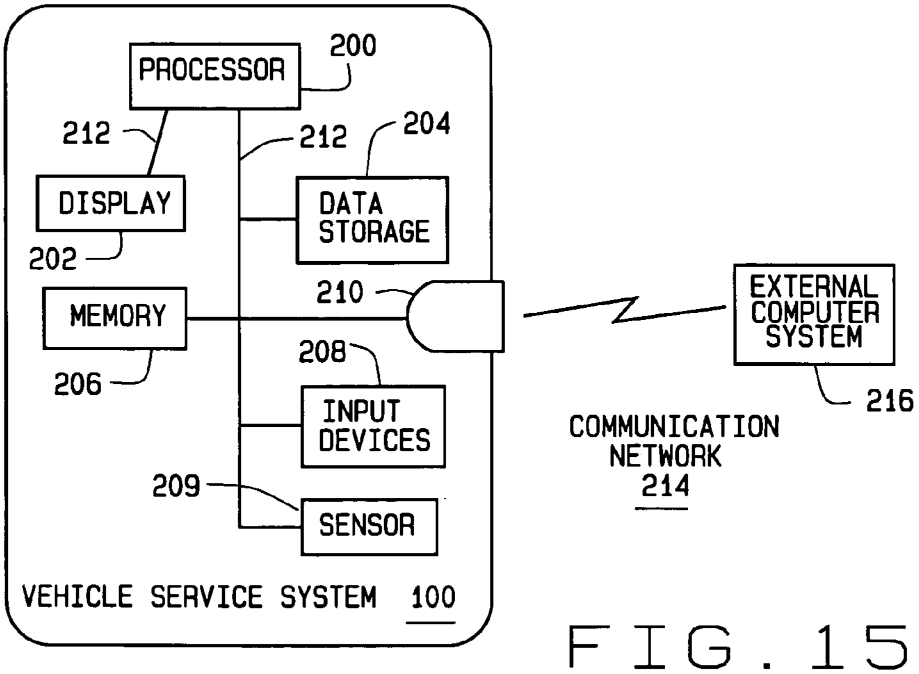
FIG. 15 is a block diagram of a vehicle service system of the present invention.

As shown in FIG. 15, a vehicle service system 100 typically consists of a processor 200, a display 202, one or more data storage components 204, such as a hard drive or other computer-readable storage, a memory 206, a communications interface 208, one or more vehicle measurement sensors 209, and one or more input devices 210. As is conventional, the various components of the vehicle service system 100 are preferably coupled to the processor 200 via one or more data buses 212. Similarly, the communications interface 208 may be continuously or selectively linked to a communications network 214 for exchanging information with one or more computer systems 216 external to the vehicle service system 100, such as via the Internet.

Within the vehicle service system 100, the processor 200 is configured with an operating system, preferably providing the framework for a graphical user interface 102, and one or more vehicle service software applications 218 which are either stored in the memory 206 or retrieved from the data storage components 204. The vehicle service software applications provide the processor 200 with operational instructions required to carry out one or more vehicle service procedures, including the presentation of information to an operator via the interface 102.

Figure 16:
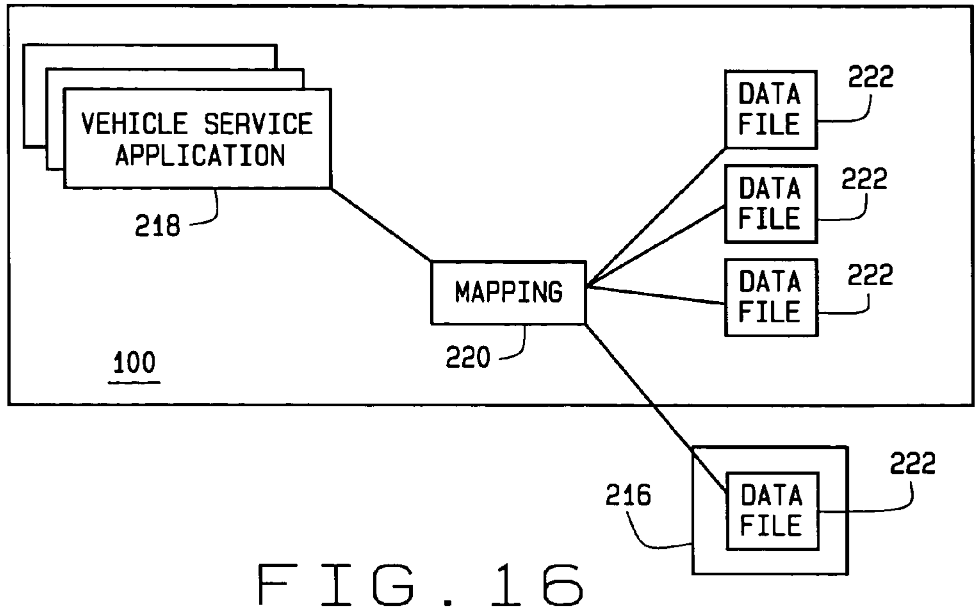
FIG. 16 is a block diagram of the interaction between a vehicle service application, a mapping, and one or more data files of the present invention.

In a preferred embodiment, as shown in FIG. 16, the vehicle service system 100 is configured with one or more mappings 220 associating data files 222 containing vehicle information with each context-sensitive assistance element 106 displayed by the processor 200 during execution of a vehicle service software application 218. The data files 222 may be stored within the vehicle service system 100, or may be stored in a external computer system 216 and accessed via the communications network 214. Information stored in the mappings 220 is utilized by the processor 100 during the execution of the vehicle service software application 218 to identify when and where to display each context-sensitive assistance element 106, and to determine what corresponding data file should be accessed to retrieve information upon selection or activation of each assistance element 106 by an operator.

For example, an entry in the mapping 220 may indicate that an illustration contained in a data file 222 is appropriate for display in connection with all vehicle selections of a particular make, while another entry in the mapping 220 may indicate that a particular illustration contained in a data file 222 is appropriate for display only after the operator has identified a particular vehicle model. Entries in the mapping 220 can use "wild cards" to associate data files 222 with more than one vehicle make, model, year, or option levels.

The mappings 220 and data files 222 are maintained in the vehicle service system 100 or an external computer system 216 independent of the vehicle service applications 218, and may be modified, replaced, or deleted without requiring modification of the vehicle service applications 218. Each data file 222 may include text, graphics, tables, and multimedia content. The data file 222 may further include "hyperlinks" and "bookmarks" to additional data stored in either the same data file 222 or in a different data file 222. Those of ordinary skill in the art will recognize that other types of data may be stored in data files 222, including database entry identifiers, vehicle measurement identifiers corresponding to predetermined measurement variable in the vehicle service application, and instructions directing the vehicle service application or processor 100 to carry out one or more specific commands.

In the preferred embodiment of the present invention, each data file 222 is an hyper-text markup language (HTML) file, and the vehicle service system 100 is configured with a web-browser application capable of accessing and displaying information stored in any standard HTML format, including text, images, programming scripts, Active-X components, and links to other HTML files. For example, a sequence of data files 222 detailing steps in a vehicle service procedure may each include links identifying previous and subsequent data files 222 in the sequence, whereby a vehicle service application 218 is configured to permit an operator to navigate through information stored in the data files in a predetermined sequence during a vehicle service procedure using the interface navigation keys 105.

Information stored in a data file 222 may optionally includes tags identifying text for translation into a selected language prior to display to an operator. The vehicle service application 218 is configured to utilized the tags to identify a corresponding language translation from database of translated words and phrases prior to displaying the text to an operator. For example, a predetermined text phrase or word to be displayed to an operator is identified by a unique translation tag in a data file 222. The vehicle service application retrieves the unique translation tag, and utilizes the unique translation tag to retrieve a corresponding text phrase or word from a foreign language database, which is then displayed to the operator in place of English text (or the default language text), on the display 109 as shown in FIG. 16.

Figure 17:
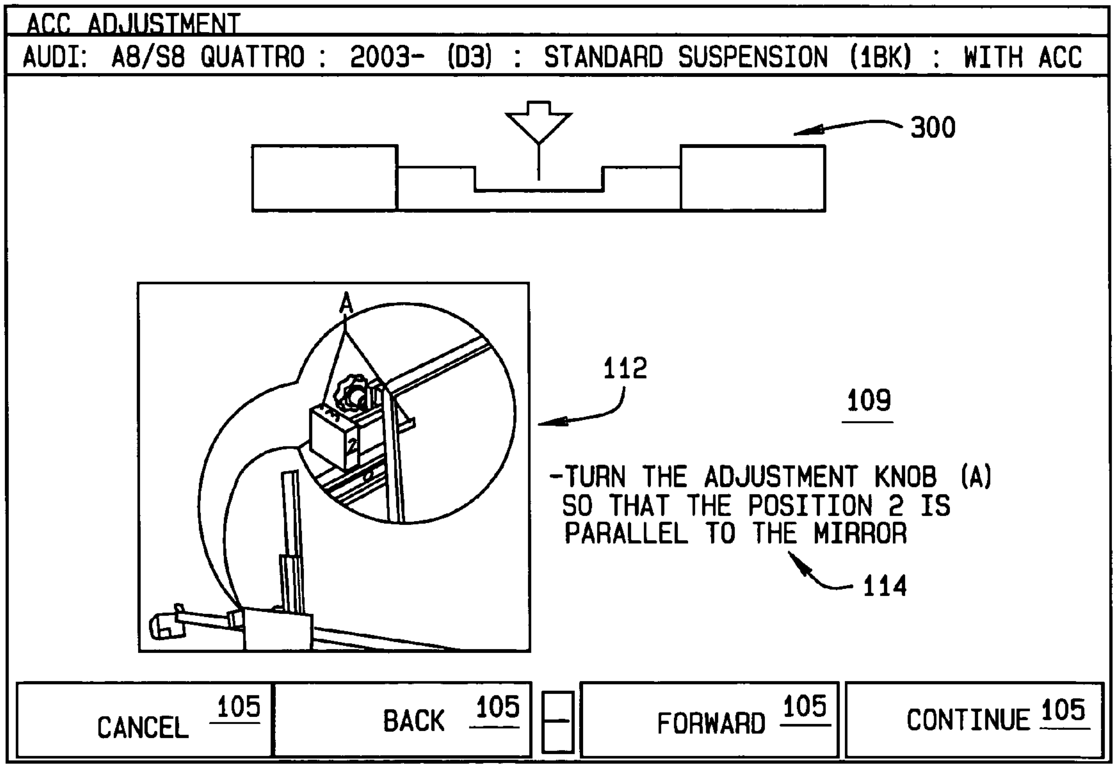
FIG. 17 is an illustration of a current vehicle-specific measurement-display screen generated by an interactive vehicle measurement component contained in an associated data file.

Information stored in a data file 22 may optionally include database entry identifiers, providing directed access to entries in a separate database such as a vehicle specification database. The database may be located either in the vehicle service system 100 or at an external computer system 216. Alternatively, the database entry identifiers may provide directed access to current vehicle measurements obtained by a sensor 209 of the vehicle service system 100 and stored in a current measurements database. When an assistance element 106 mapped to a vehicle specification database entry is selected by an operator, the vehicle service application retrieves and displays to the operator the corresponding data value stored in the specification database entry. Similarly, when an assistance element 106 mapped to a vehicle measurement is selected by an operator, the vehicle service application is configured to obtain a current value for the associated vehicle measurement and display it to the operator either in textual or graphical format. A graphical format, for example, may include a bar graph 300 as shown in FIG. 17 or other quantitative visual display of the measurement information, and may optionally include additional information such as acceptable tolerance values.

Information stored in a data file 222 may optionally include instructions or commands directing a vehicle service application to perform one or more specialized functions. For example, in a vehicle service system 100 configured with a vehicle wheel alignment software application, selection of a context-sensitive assistance element 106 by an operator may direct the vehicle wheel alignment software application to override a requirement for compensation of a sensor, to verify a sensor compensation, or to initiate one or more specific vehicle wheel alignment procedures.

Information stored in a data file 222 may optionally be provided with tags or attributes limiting use of the information under one or more specific operating conditions for the vehicle service system 100. For example, tags included in a data file 222 may restrict access to the associated data to only specific versions of a vehicle service application 218, or only to vehicle service systems 100 configured with specific types of sensors 209. Utilizing limiting tags or attributed in each data file 222 permits a single data file to include information for multiple versions of a vehicle service application 218, eliminating a requirement for a separate data file 222 for each different version of a vehicle service application 218. In this manner, a vehicle service application 218 could be upgraded or replaced without requiring a corresponding change to either the mapping 220 or the associated data files 222.

As a method for facilitating the identification or service of a vehicle, the present invention involves several steps, including execution of a vehicle service application on a suitable vehicle service system. During execution of the vehicle service application, a mapping identifying the availability of information external to the vehicle service application is accessed by the vehicle service application. In response to an operator directed action, the vehicle service application utilizes the mapping to retrieve the external information from one or more data files, which may be either stored locally at the vehicle service system, or stored at a remote computer system and accessed over a communications network. The vehicle service application then utilizes the retrieved data to perform one or more functions, which may include displaying information to an operator to assist in a vehicle identification or the completion of a vehicle service procedure, executing a sequence of instructions, or retrieving additional data. In response to additional operator input, or the completion of a predetermined sequence of instructions, the vehicle service application resumes conventional operation.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved computerized vehicle service system having a processor configured with at least one vehicle service application, a display coupled to the processor, and at least one input device coupled to the processor, the improvement comprising:

a mapping between at least one vehicle service application and at least one data file of information associated with at least one vehicle model; and wherein the processor is further configured to access said mapping during execution of said at least one vehicle service application to provide an operator with at least one context-sensitive assistance element indicating the availability of said associated information.

2. The improved computerized vehicle service system of claim 1 wherein the at least one vehicle service application is configured to present an operator with a plurality of vehicle identification selection on the display, and wherein said mapping identifies placement of said at least one context-sensitive assistance element on the display.

3. The improved computerized vehicle service system of claim 2 wherein said at least one context-sensitive assistance element is associated through said mapping with a representation of at least one vehicle model.

4. The improved computerized vehicle service system of claim 2 wherein said at least one context-sensitive assistance element is associated through said mapping with an illustration of at least one identifying vehicle component.

5. The improved computerized vehicle service system of claim 2 wherein said at least one context-sensitive assistance element is associated through said mapping with a textual description of at least one vehicle model identifying feature.

6. The improved computerized vehicle service system of claim 2 wherein said at least one context-sensitive assistance element is associated through said mapping with a textual description of at least one vehicle model-specific identifying feature.

7. The improved computerized vehicle service system of claim 1 wherein mapping is independent of the at least one vehicle service application, whereby said mapping may be modified, removed, and replaced without requiring modification of the at least one vehicle service application.

8. The improved computerized vehicle service system of claim 1 wherein said mapping is stored in a memory operatively coupled to the processor.

9. The improved computerized vehicle service system of claim 1 wherein at least one of said data files is stored in a remote computer system operatively coupled to the processor through a communications network, and wherein the at least one vehicle service application is configured to access said at least one data file over said communications network.

10. The improved computerized vehicle service system of claim 1 wherein said at least one data file includes information elements selected from a set of elements including text, graphics, tables, multi-media content, hyperlinks, and bookmarks to external information elements.

11. The improved computerized vehicle service system of claim 1 wherein said at least one data file includes one or more language translation tags associated with said vehicle identifying information.

12. The improved computerized vehicle service system of claim 1 wherein the at least one vehicle service application is configured to access said mapping responsive to operator selection of said at least one context-sensitive assistance element indicating the availability of information provided on the display.

13. The improved computerized vehicle service system of claim 1 wherein one or more data files are independent of the at least one vehicle service application, whereby said one or more data files may be modified, removed, and replaced without requiring modification of the at least one vehicle service application.

14. An improved computerized vehicle service system having a processor configured with at least one vehicle service application, a display coupled to the processor, and at least one input device coupled to the processor, the improvement comprising:

a mapping between at least one vehicle service application and at least one HTML data file of context-sensitive information; and wherein the processor is further configured to access said mapping during execution of said at least one vehicle service application to provide an operator with at least one interactive element indicating the availability of context-sensitive information.

15. The improved computerized vehicle service system of claim 14 wherein said mapping is stored in a memory operatively coupled to the processor.

16. The improved computerized vehicle service system of claim 14 wherein said at least one data file is stored in a remote computer system operatively coupled to the processor through a communications network, and wherein the at least one vehicle service application is configured to access said at least one data file over said communications network.

17. The improved computerized vehicle service system of claim 14 wherein said at least one data file includes information elements selected from a set of elements including text, graphics, tables, multi-media content, and hyperlinks to external information elements.

18. The improved computerized vehicle service system of claim 14 wherein said at least one data file includes information elements selected from a set of elements including database entry identifiers, vehicle measurement identifiers, or vehicle service system operating commands.

19. The improved computerized vehicle service system of claim 14 wherein said at least one data file includes at least one language translation tag associated with said vehicle identifying information.

20. The improved computerized vehicle service system of claim 14 wherein the at least one vehicle service application is configured to access said mapping responsive to operator selection of said at least one interactive element indicating the availability of context-sensitive information provided on the display.

21. The improved computerized vehicle service system of claim 14 wherein mapping is independent of the at least one vehicle service application, whereby said mapping may be modified, removed, and replaced without requiring modification of the at least one vehicle service application.

22. The improved computerized vehicle service system of claim 14 wherein said at least one data file is independent of the at least one vehicle service application, whereby said data file may be modified, removed, and replaced without requiring modification of said vehicle service application.

23. A method for operation of a vehicle service system having a processor configured with a vehicle service application, at least one data storage component operatively coupled to the processor, a display operatively coupled to the processor, and at least one operator-directed input device coupled to the processor, comprising:

executing the vehicle service application;

accessing a mapping of available information external to the vehicle service application;

providing the operator with an indication of the availability of said information;

responsive to operator input received through said input device, utilizing said mapping to retrieve said external information; and utilizing said retrieved external information to display information to an operator to assist in a vehicle identification.

24. The method of claim 23 for the operation of a vehicle service system wherein said step of utilizing said mapping to retrieve said external information includes accessing, through a communications network, at least one data file stored at a remote computer system.

25. The method of claim 23 for the operation of a vehicle service system further including the step of altering said mapping without modification of the at least one vehicle service application.

26. The method of claim 23 for the operation of a vehicle service system wherein said displayed information includes a representation of at least one vehicle model.

27. The method of claim 23 for the operation of a vehicle service system wherein said displayed information includes a representation of at least one vehicle component.

28. A method for operation of a vehicle service system having a processor configured with a vehicle service application, at least one data storage component operatively coupled to the processor, a display operatively coupled to the processor, and at least one operator directed input device coupled to the processor, comprising:

executing the vehicle service application;

accessing a mapping of available information external to the vehicle service application;

providing the operator with an indication of the availability of said information;

responsive to operator input received through said input device, utilizing said mapping to retrieve said external information; and utilizing said retrieved external information to display information to an operator to assist in a vehicle service procedure.

29. The method of claim 28 wherein the step of utilizing said retrieved external information includes executing a sequence of instructions.

30. The method of claim 28 for the operation of a vehicle service system further including the step of altering said mapping without modification of the at least one vehicle service application.

31. The method of claim 28 for the operation of a vehicle service system wherein said step of utilizing said mapping to retrieve said external information includes accessing, through a communications network, at least one data file stored at a remote computer system.

32. An improved vehicle service system having a processor configured with at least one vehicle service application to provide an operator with at least one selection during a vehicle service procedure, a display coupled to the processor, and at least one input device coupled to the processor, the improvement comprising:

wherein the processor is further configured to present an operator with an option to view, on the display, assistance information associated with the at least one selection, said assistance information providing an operator with additional information to aid in the choice of said at least one selection.

33. The improved vehicle service system of claim 32 wherein the at least one selection presented to an operator includes a vehicle selection; and wherein said associated information is vehicle information selected to aid in the identification of said vehicle.

34. The improved vehicle service system of claim 33 wherein said associated information is a textual description of a unique vehicle model identifying feature.

35. The improved vehicle service system of claim 33 wherein said associated information includes an image of a vehicle model identifying component.

36. The improved vehicle service system of claim 33 wherein said associated information includes an image of a vehicle model.

37. The improved vehicle service system of claim 32 wherein the at least one selection presented to an operator includes a vehicle service procedure; and wherein said associated information is service procedure assistance information.

38. The improved vehicle service system of claim 32 wherein said processor is further configured to retrieve said associated information from a data store responsive to an operator command.

39. A method for operation of a vehicle service system having a processor configured with a vehicle service application, at least one data storage component operatively coupled to the processor, a display operatively coupled to the processor, and at least one operator directed input device coupled to the processor, comprising:

executing the vehicle service application;

providing an operator With at least one selection during said execution of said vehicle service application;

indicating an availability of assistance information associated with said at least one selection to aid in the choice of said at least one selection;

responsive to operator input, providing said available assistance information to said operator.

40. The method of claim 39 wherein said at least one selection is a vehicle selection; and wherein said available assistance information includes vehicle identification information.

41. The method of claim 39 wherein said at least one selection is a vehicle service procedure; and wherein said available assistance information includes vehicle service procedure assistance.

* * * * *